Patented May 14, 1935

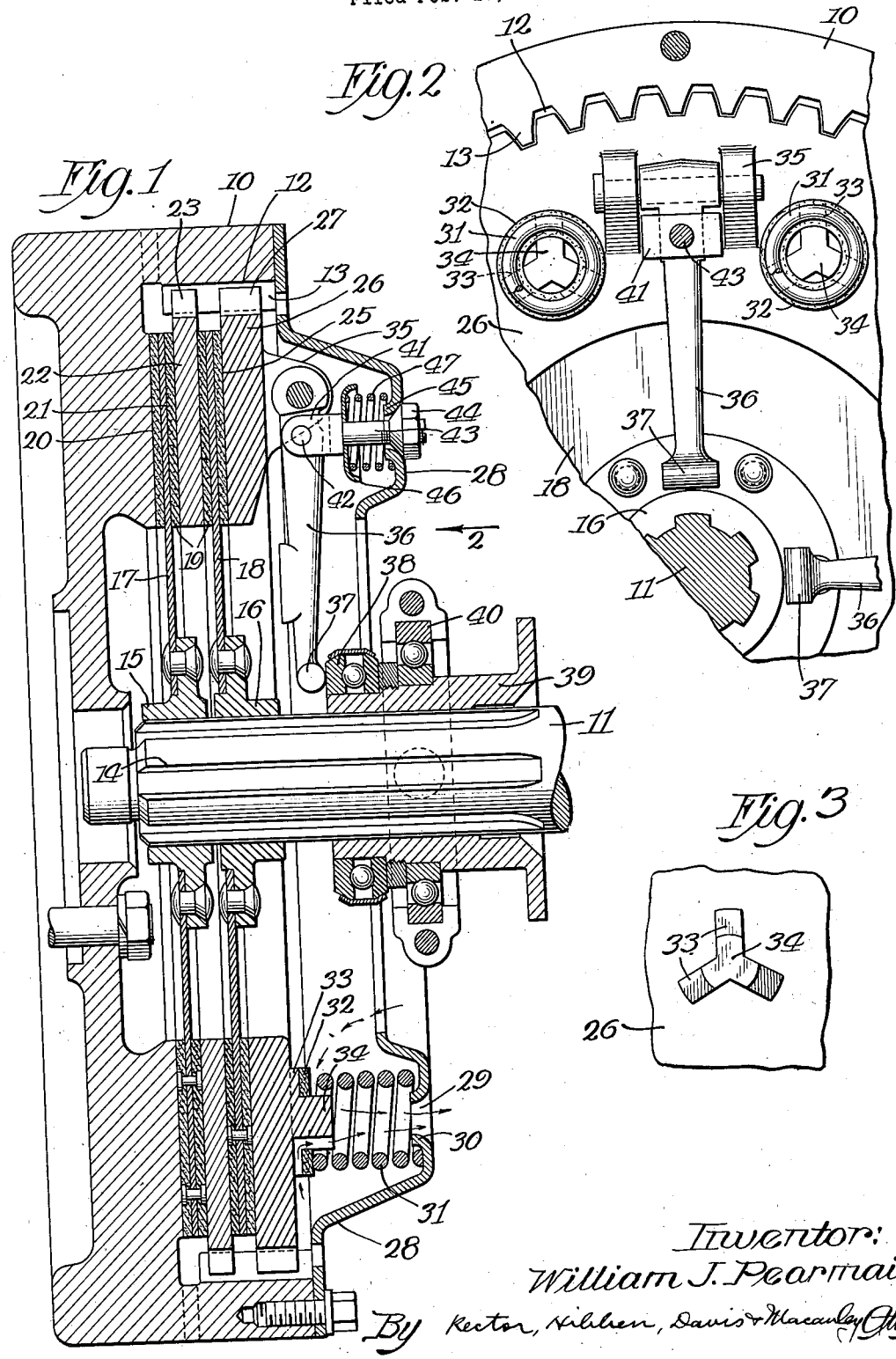

2,001,395

UNITED STATES PATENT OFFICE 2,001,395

CLUTCH

William J. Pearmain, Racine, Wis., assignor to Twin Disc Clutch Company, Racine, Wis., a corporation of Wisconsin Application February 17, 1932, Serial No. 593,444

9 Claims. (Cl. 192—69)

My invention relates to clutches and is directed more particularly to a clutch in which a transmission of power is effected between rotary parts through mechanism which is normally in driving engagement.

One object of my invention is to devise a clutch in which the unloading mechanism includes parts which have substantially universal connection with the floating plate which grips the clutch or friction plate against the flywheel, or other rotary part, with a view of obtaining free movement, within limits, of the parts in question, resulting in their operation to the best advantage and an allowance for any manufacturing discrepancies in the several parts that might become noticeable upon assembly.

A further object is to provide a clutch of the character described in which the parts of the unloading mechanism may freely assume positions best suited to the release of the clutch, with a consequent reduction in the imposed stresses as compared with standard forms of construction and an improvement in the over-all strength characteristic of the clutch.

A further object is to devise a clutch in which the levers are directly mounted on the floating plate, the fulcrums for the levers being provided by rods which have a substantially universal anchorage on a cover plate, resulting in certain improvements from the standpoint of simplicity, flexibility, and capacity for direct action.

A further object is to provide a novel mounting for the clutch springs that is specially arranged to heat insulate the springs from contact with the floating plate and to facilitate the circulation of air through and around the springs in order to avoid the deleterious effect of heat on the springs.

A further object is to devise a special type of clutch cover which is preferably in the form of a stamping having provision for receiving the fulcrum rods of the clutch levers and also having abutments for receiving one end of each clutch spring.

These and further objects of my invention will be set forth in the following specification, reference being had to the accompanying drawing, and the novel means by which said objects are effectuated will be definitely pointed out in the claims.

In the drawing:

Figure 1 is a sectional elevation of my improved clutch, showing the several parts in driving engagement.

Fig. 2 is an elevation of a portion of the clutch as viewed in the direction of the arrow 2 in Fig. 1, the clutch cover being removed.

Fig. 3 is a plan view of one of the spring centering bosses provided on the floating plate.

Referring to Fig. 1, the numerals 10 and 11 designate, respectively, a flywheel and a shaft which, for purpose of illustration, may be regarded generally as the driving and driven members. The flywheel 10 is internally bored, as at 12, and provided with internal gear teeth 13 for a purpose hereinafter explained. One end of the shaft 11 is splined as at 14 to receive a pair of hubs 15 and 16, which are thereby compelled to partake of the rotary motion of the shaft, but are capacitated for axial movement therealong. The hubs 15 and 16 have secured thereto friction plates 17 and 18, respectively, each of which has attached thereto on opposite sides facings of frictional material 19.

The inner facing 19 on the plate 17 is intended to engage with the inner face 20 provided by the counterboring of the flywheel 10, while the outer facing 21 is intended to engage with the inner side of a floating plate 22 having peripheral, gear teeth 23 which mesh with the flywheel gear teeth 13, thereby securing a driving engagement between the flywheel and the plate 22, but permitting a slight axial movement of said plate with reference to said flywheel. Similarly, the inner facing 19 on the friction plate 18 is intended to engage with the opposite side of the floating plate 22, while the outer facing on the plate 18 is intended to engage with the inner face 25 on a second floating plate 26 having peripheral gear teeth 27 which mesh with the gear teeth 13, so that the plate 26 moves together with the plate 22 and the flywheel 10, but is also arranged for axial movement relative to said flywheel and said plate.

A cover plate 28, preferably in the form of a stamping, is secured to the flywheel 10 and partially bridges the counterbored portion thereof. At a convenient distance radially from the shaft 11, the plate 28 is provided with a plurality of openings 29 which are defined by flanges 30 that project toward the floating plate 26. Said flanges function as centering bosses for one end of clutch springs 31 whose opposite ends abut against heat insulating washers 32 which in turn are seated against centering bosses 33, each of which has a Y-shaped section, or is generally in the form of a plurality of radially disposed arms. The centering portion of the bosses 33 is provided by portions 34 having substantially the same arrangement, but in which the arms are arranged with a shorter length in order to permit their insertion within the coils of the spring 31. As indicated in the figures, this arrangement of centering bosses on the floating plate 26 provides for an intermittent support of the adjacent ends of the spring, leaving the intervening portions of the adjacent spring coils free of any contact with the floating plate and thereby facilitating the circulation of air currents inwardly between the arms of the bosses and outwardly through the spring coils for discharge through the opening 29. By this arrangement, the clutch springs are effectively cooled and are prevented from acquiring a permanent set if the clutch should become overheated due to slippage or insufficient capacity. The washers 32, which may be formed of asbestos or any suitable material, tend to protect the springs from what would otherwise be directly conducted heat from the floating plate. The circulation of air, with respect to each spring, is more or less diagrammatically indicated by the arrows in Fig. 1.

One of the most important features of my improved clutch resides in the novel construction of the unloading mechanism and this portion of the device will now be described. The outer face of the floating plate 26 is provided with a plurality of pairs of ears 35, between each pair of which is pivotally mounted the outer end of a clutch lever 36. The inner end of each clutch lever is formed as a nose 37, located adjacent the shaft 11 and intended to cooperate with a ball bearing collar 38 mounted on a sleeve 39 which is movable along the shaft 11. This sleeve also carries a collar 40 which may be provided with the usual trunnions for engagement with a suitable lever (not shown) that may be actuated in any desired manner to shift the sleeve 39 along the shaft 11.

The fulcrum for each lever 36 is provided by the clevised end 41 of a rod which is pivotally secured to said lever by means of a pin 42 and the threaded shank of which rod projects through an opening provided in the cover plate 28 and which is defined by an inwardly extending flange 45. Externally of the cover plate 28, a ball-headed nut 44 is mounted on the threaded shank 43 for engagement with the adjacent surface provided by the flange 45. A cupped washer 46 is mounted on the shank 43 against the shoulder defined by the junction of the clevis 41 and shank and between said washer and the adjacent portion of the cover plate 28 is provided a coil spring 47 whose tendency to normally extend in length maintains the engagement of the ball-headed nut 44 with the flange 45 and accordingly prevents any rattling tendency of the clutch lever 36.

As shown in Fig. 1, the various members of the clutch are in driving position, owing to the pressure furnished by the springs 31 which grip the friction plates 17 and 18 between the flywheel and floating plates. In this connection, it will be understood that, while the type of clutch illustrated embodies a double floating plate construction, those features to which the present application are more particularly directed are not dependent in any manner upon the number of floating plates and that one or more than two of these elements may be employed if desired. Likewise, my invention is not specially concerned with the type of driving connection between the flywheel and floating plate, as any of the well known practices may be adopted in this respect.

To release the clutch and thus interrupt the flow of power from the flywheel 10 to the shaft 11, the sleeve 39 is moved along said shaft toward the left, as viewed in Fig. 1, thus causing a similar movement of the noses 37 on the clutch levers 36. For each lever, the fulcrum of the movement which then follows will be exercised against the pin 42, thus exerting a pull on the clevis rod with a resulting carriage of the floating plate 26 toward the right. When the sleeve 39 is moved in the opposite direction, the clutch springs 31 will renew the driving engagement of the several parts.

The foregoing type of clutch structure is characterized by simplicity of design, ease of assembly and adjustment, and ready accessibility for repair. The substantially rockable mounting of the clevis rods which provide the fulcrums for the clutch levers assures a favorable degree of flexibility and direct action for these parts, while the springs 47 on these clevis rods substantially prevent any rattling of the levers during operation. The cover plate 28, being preferably formed as a stamping, facilitates manufacture and it will be noted from an examination of Fig. 1 that the flanges 30 and 45 are of substantially the same nature, a feature which lessens the complexity of the die by which the stamping is formed. The arrangement whereby the clutch springs are air cooled during operation of the clutch is an important feature of my invention and it will be particularly noted that the necessity of providing spring centering bosses on the floating plate 26 has been availed of to provide a form which not only satisfactorily meets the operating conditions, so far as providing a satisfactory abutment of this nature is concerned, but the bosses have also been shaped and arranged to effectively promote the circulation of air through and around the several clutch springs.

While I have shown one set of elements and combinations thereof for effectuating my improved clutch, it will be understood that the same is intended for purpose of illustration only and in no wise to restrict the device to the exact forms and structures shown, for many changes may be made therein without departing from the spirit of my invention.

I claim:

1. In a clutch, the combination with a friction plate attachable to a rotary part, a pair of gripping members connectible to a second rotary part and disposed on opposite sides of said plate, one of said members constituting a floating plate movable axially relative to the other member, and springs for maintaining the driving engagement of said members and friction plate, of unloading mechanism for releasing said engagement comprising levers rockably mounted on said floating plate, a cover plate secured to said other gripping member, fulcrum rods rockably mounted at one end on said cover plate and connected at the other end to said levers, and means for operating said levers.

2. In a clutch, the combination with a friction plate attachable to a rotary part, a pair of gripping members connectible to a second rotary part and disposed on opposite sides of said plate, one of said members constituting a floating plate movable axially relative to the other member, and springs for maintaining the driving engagement of said members and friction plate, of unloading mechanism for releasing said engagement comprising levers rockably mounted on said floating plate, a cover plate having flanged openings secured to said other gripping member, fulcrum rods connected at one end to said levers and having threaded portions extending through said openings, ball-headed nuts mounted on said portions for substantially universal engagement with the flanges defining said openings, and means for operating said levers.

3. In a clutch, the combination with a friction plate attachable to a rotary part, a pair of gripping members connectible to a second rotary part and disposed on opposite sides of said plate, one of said members constituting a floating plate movable axially relative to the other member, and springs for maintaining the driving engagement of said members and friction plate, of unloading mechanism for releasing said engagement comprising levers rockably mounted on said floating plate, a cover plate having socket openings secured to said other gripping member, fulcrum rods having clevis portions connected to said levers and having threaded portions extending through said openings, ball-headed nuts mounted on said threaded portions for substantially universal engagement with the walls defining said openings, and means for operating said levers.

4. In a clutch, the combination with a friction plate attachable to a rotary part, a pair of gripping members connectible to a second rotary part and disposed on opposite sides of said plate, one of said members constituting a floating plate movable axially relative to the other member, and springs for maintaining the driving engagement of said members and friction plate, of unloading mechanism for releasing said engagement comprising levers rockably mounted on said floating plate, a cover plate having socket openings secured to said other gripping member, fulcrum rods having clevis portions connected to said levers and threaded portions extending through said openings, ball-headed nuts mounted on said threaded portions for substantially universal engagement with the walls defining said openings, washers seated against the shoulders provided by said clevis portions, springs mounted on said threaded portions between said washers and cover plate, and means for operating said levers.

5. In a clutch, the combination with a friction plate attachable to a rotary part, a pair of gripping members connectible to a second rotary part and disposed on opposite sides of said plate, one of said members constituting a floating plate movable axially relative to the other member, and springs for maintaining the driving engagement of said members and friction plate, of unloading mechanism for releasing said engagement comprising levers rockably mounted on said floating plate, a cover plate having socket openings secured to said other gripping member, fulcrum rods connected at one end to said levers and having portions extending through said openings, devices mounted on said portions having substantially universal engagement with the walls defining said openings, and means for operating said levers.

6. In a friction clutch, a cover plate adapted for securement to one of the gripping members of the clutch and comprising a plurality of substantially equally sized flanged openings, certain of said openings freely receiving the ends of the fulcrum means for the clutch levers and the flanges around other openings defining centering bosses for the clutch springs.

7. In a clutch, the combination with a friction plate attachable to a rotary part, a pair of gripping members connectible to a second rotary part and disposed on opposite sides of said plate, one of said members constituting a floating plate movable axially relative to the other member, and springs for maintaining the driving engagement of said members and friction plate, of unloading mechanism for releasing said engagement comprising levers rockably mounted on said floating plate, a cover plate having a plurality of flanged openings secured to said other gripping member, fulcrum rods having a substantially rockable connection at one end with the flanges defining certain of said openings and connected at the other end to said levers, the flanges around the remainder of said openings defining centering bosses for said springs, and means for operating said levers.

8. In a clutch, the combination with a friction plate attachable to a rotary part, a pair of gripping members connectible to a second rotary part and disposed on opposite sides of said plate, one of said members constituting a floating plate movable axially relative to the other member, and springs for maintaining the driving engagement of said members and friction plate, of unloading mechanism for releasing said engagement comprising levers rockably mounted on said floating plate, a cover plate having a plurality of substantially equally sized flanged openings secured to said other gripping member, fulcrum rods freely supported at one end on the flanges defining certain of said openings and connected at the other end to said levers, the flanges around other of said openings defining centering bosses for said springs, and means for operating said levers.

9. In a clutch, the combination with a friction plate attachable to a rotary part, a pair of gripping members connectible to a second rotary part and disposed on opposite sides of said plate, one of said members constituting a floating plate movable axially relative to the other member, and springs for maintaining the driving engagement of said members and friction plate, of unloading mechanism for releasing said engagement comprising levers rockably mounted on said floating plate, a cover plate having a plurality of flanged openings secured to said other gripping member, fulcrum rods supported at one end on the flanges defining certain of said openings and connected at the other end to said levers, the flanges around the remainder of said openings defining centering bosses for said springs, each of said rods having a shoulder spaced from said cover plate, springs encircling said rods between said shoulders and cover plate, and means for operating said levers.

WILLIAM J. PEARMAIN.